United States Patent
Saunders et al.

(10) Patent No.: US 12,227,358 B1
(45) Date of Patent: Feb. 18, 2025

(54) AUTOMATED WAREHOUSE ORDER PICKING

(71) Applicant: Hummingbird IP Holdco, LLC, Rye, NH (US)

(72) Inventors: Nicholas Mitchell Saunders, Rye, NH (US); Bruce Edward Welty, Amherst, MA (US); David Scott Barrett, Needham, MA (US); Christopher Mark Griffin, Hampton, NH (US); Jonathan Davis Taylor, Pittsburgh, PA (US); Aaron John Emerick, Gibsonia, PA (US)

(73) Assignee: Hummingbird IP Holdco, LLC, Rye, NH (US)

( * ) Notice: Subject to any disclaimer, the term of this patent is extended or adjusted under 35 U.S.C. 154(b) by 0 days.

(21) Appl. No.: 18/654,870

(22) Filed: May 3, 2024

Related U.S. Application Data

(60) Provisional application No. 63/463,938, filed on May 4, 2023.

(51) Int. Cl.
   *G06F 7/00* (2006.01)
   *B65G 1/04* (2006.01)
   *B65G 1/137* (2006.01)

(52) U.S. Cl.
   CPC ......... *B65G 1/1373* (2013.01); *B65G 1/0485* (2013.01)

(58) Field of Classification Search
   CPC .......................... B65G 1/1373; B65G 1/0485
   USPC ................................ 700/213, 216, 218, 228
   See application file for complete search history.

(56) References Cited

U.S. PATENT DOCUMENTS

| | | | |
|---|---|---|---|
| 3,908,065 A | * | 9/1975 | Stigen ............... B32B 7/12 |
| | | | 428/323 |
| 9,714,139 B1 | | 7/2017 | Aggarwal |
| 10,007,890 B1 | | 6/2018 | Purwin et al. |
| 10,150,564 B2 | | 12/2018 | Porat |
| 10,336,543 B1 | | 7/2019 | Sills et al. |
| 10,661,899 B2 | | 5/2020 | Beaman et al. |
| 10,717,190 B2 | | 7/2020 | Bosworth et al. |
| 11,164,149 B1 | | 11/2021 | Williams et al. |
| 11,584,003 B2 | | 2/2023 | Bosworth |
| 2017/0076354 A1 | | 3/2017 | High et al. |
| 2018/0036889 A1 | * | 2/2018 | Birkmeyer ......... B25J 15/0608 |
| 2020/0172244 A1 | | 6/2020 | Green et al. |
| 2021/0142276 A1 | * | 5/2021 | Gupte ............ G06Q 10/06315 |
| 2022/0118133 A1 | * | 4/2022 | Rephaeli ............ G06V 10/141 |

(Continued)

FOREIGN PATENT DOCUMENTS

| | | |
|---|---|---|
| DE | 102022114734 B3 * 12/2023 | |
| EP | 2886508 A1 * 6/2015 | ............ B65B 69/00 |

(Continued)

OTHER PUBLICATIONS

Invitation to Pay Additional Fees And, Where Applicable, Protest Fee mailed Sep. 5, 2024 for International Patent Application No. PCT/US2024/027713.

*Primary Examiner* — Yolanda R Cumbess
(74) *Attorney, Agent, or Firm* — Pierce Atwood LLP

(57) ABSTRACT

An automated system of airborne drones may be equipped with components for navigating within a warehouse environment, locating specific bins of product as assigned, retrieving a single item from the bin, and delivering the retrieved item to a central shipping area or disposing in a designated location including conveyor belts or mobile robotic platforms.

30 Claims, 15 Drawing Sheets

(56) References Cited

U.S. PATENT DOCUMENTS

2022/0162001 A1   5/2022   Gherardi et al.
2023/0052288 A1   2/2023   Mani et al.

FOREIGN PATENT DOCUMENTS

| EP | 3786061 | A1 | | 3/2021 | | |
|----|---------|----|----|--------|----|-----------|
| GB | 2610694 | A  | *  | 3/2023 | .............. | B25J 11/00 |
| IT | 202000019570 | A1 | | 2/2022 | | |
| JP | 2021047839 | A | * | 3/2021 | ............ | B25J 19/023 |

* cited by examiner

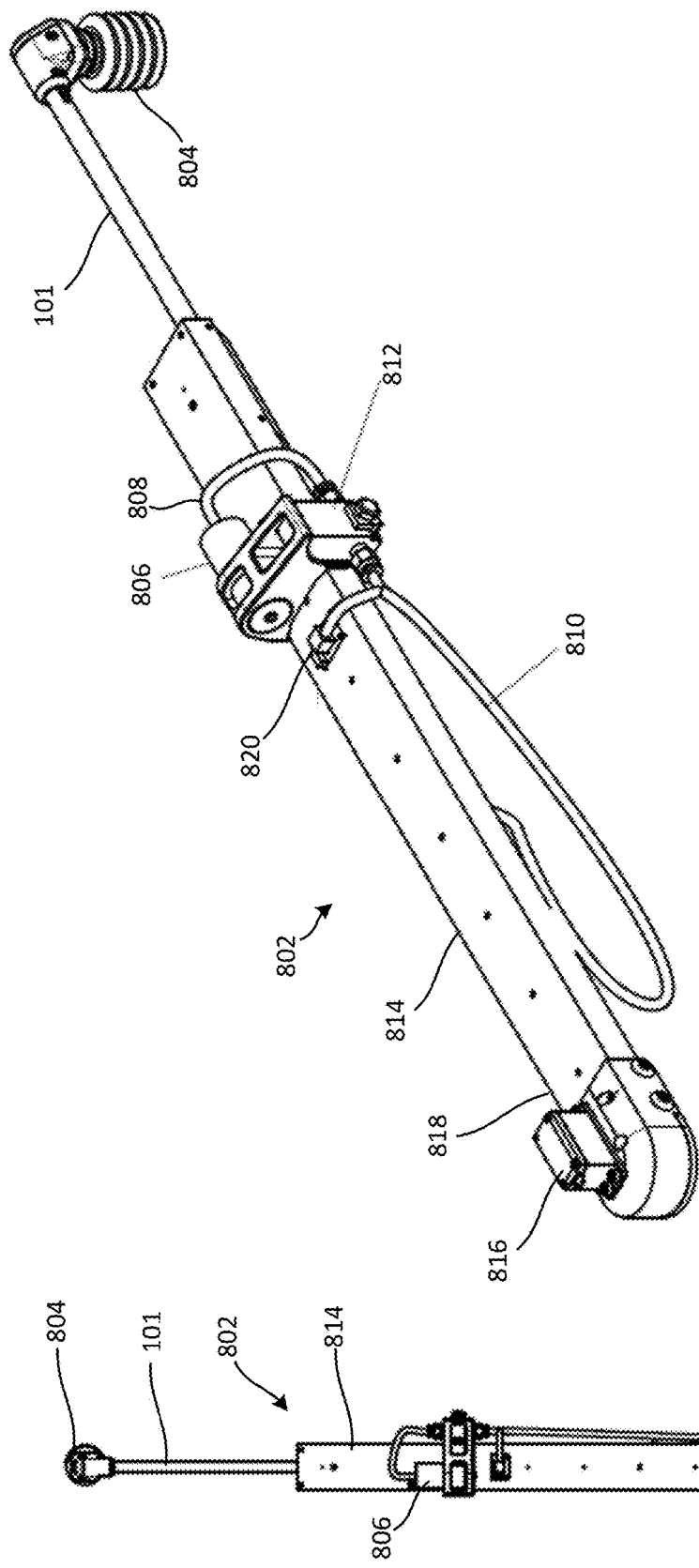
FIG. 8A
FIG. 8B
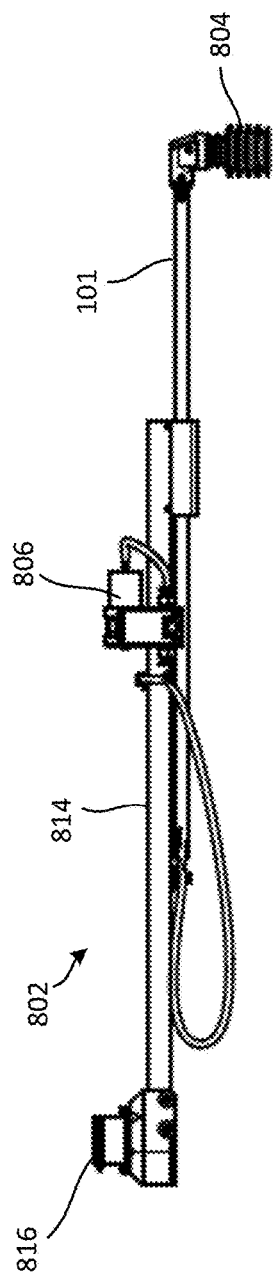
FIG. 8C

AUTOMATED WAREHOUSE ORDER PICKING

CROSS-REFERENCE TO RELATED APPLICATIONS

This application claims the benefit under 35 U.S.C. § 119(e) of U.S. Provisional Application No. 63/463,938, entitled AIRBORNE DRONE SYSTEM FOR WAREHOUSE ORDER PICKING, filed May 4, 2023, the entire contents of which are hereby incorporated by reference for all purposes.

BACKGROUND

Consumer product delivery relies on the retrieval of specified products from bins which are racked on vertical shelving in warehouses and distribution centers. The speed and accuracy of this process is of critical importance for operational efficiency and cost reduction. Additionally, the maximization of vertical space typically requires methods for accessing shelves above the reach of workers.

BRIEF DESCRIPTION OF THE DRAWINGS

FIG. 8A shows a perspective view of a second example picking arm that may be employed by a drone such as that shown in FIG. 1A, in accordance with some embodiments of the present disclosure.

FIG. 8B shows a top view of the example picking arm shown in FIG. 8A.

FIG. 8C shows a side view of the example picking arm shown in FIG. 8A.

DETAILED DESCRIPTION

Figure 2A:
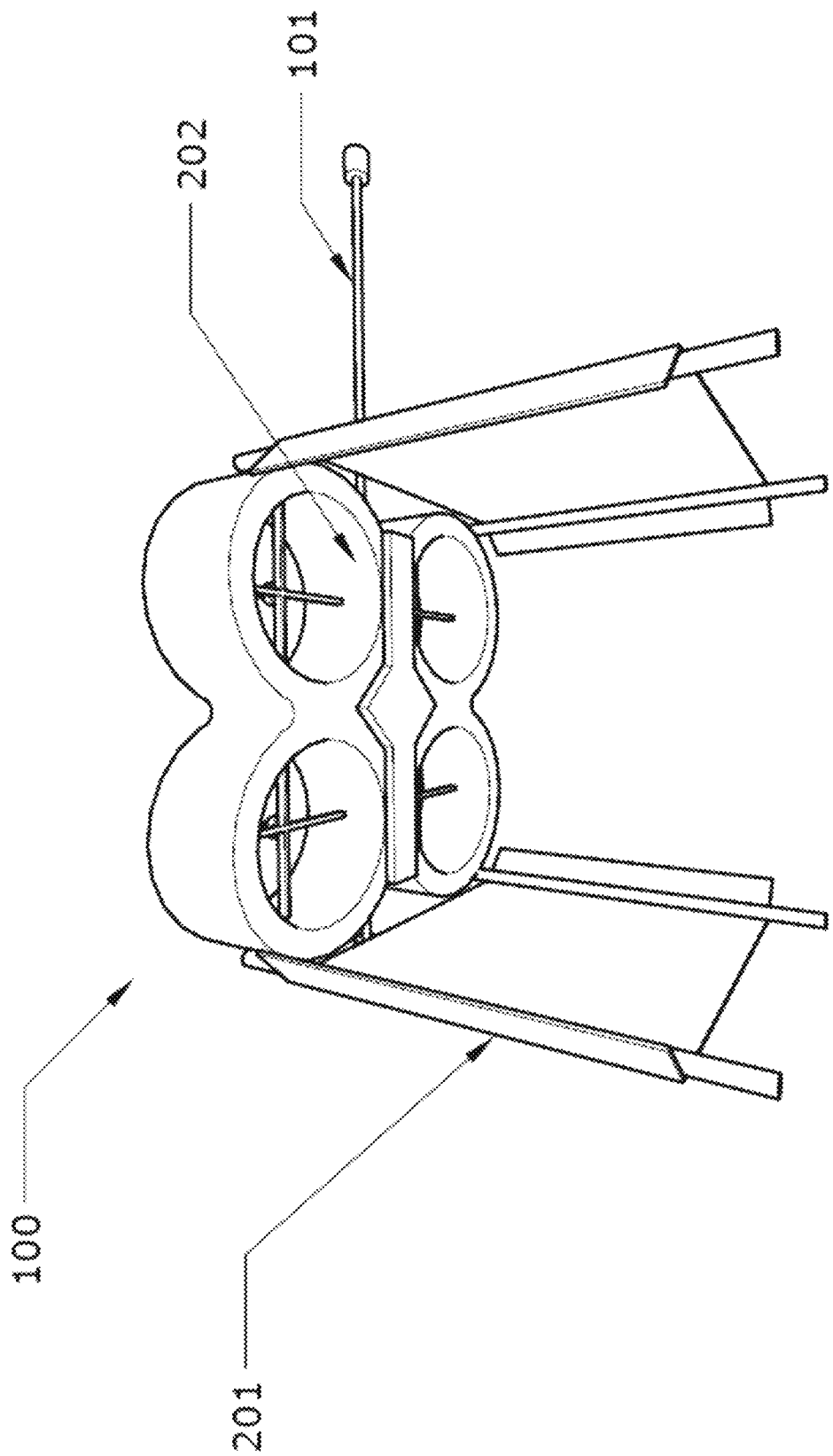
FIG. 2A illustrates the underside of the drone shown in FIG. 1A, in accordance with some embodiments of the present disclosure.
Figure 2B:
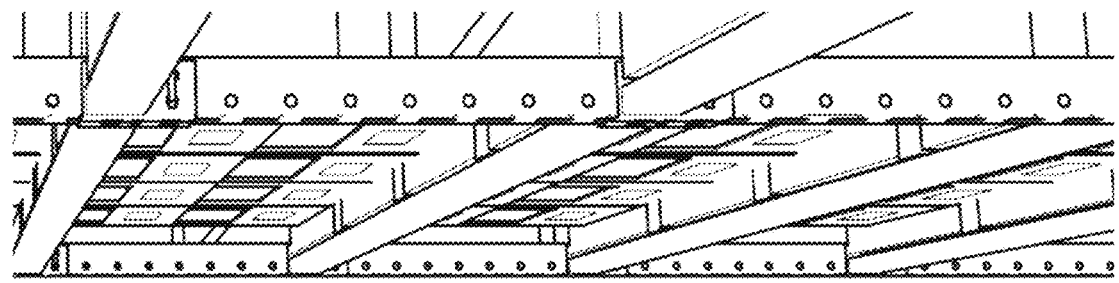
FIG. 2B illustrates how turbulence fields around the drone shown in FIG. 1A may be controlled in accordance with some embodiments of the present disclosure.
Figure 2B:
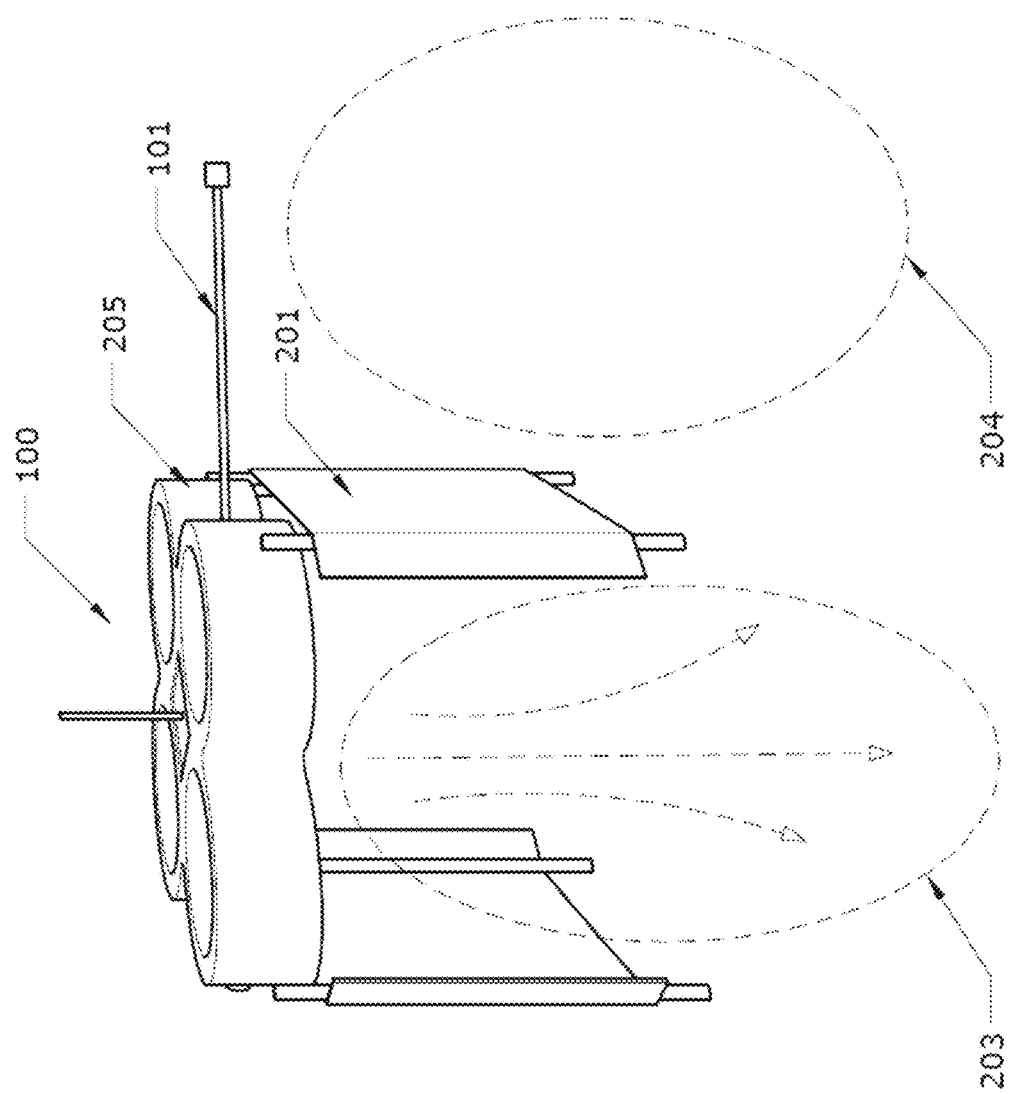

Various views of an example drone 100 are shown in the accompanying figures. As illustrated, the drone 100 may be of a quadcopter design with specialized aspects for picking products 106 in a warehouse environment. As shown in FIGS. 2A-B, the airframe of the drone 100 may form ducted and vectored rotor chambers 202 to maximize lift and manage turbulence in a region 203 underneath and around the drone 100. In addition, in some implementations, thrust shields 201 may be affixed to the picking faces 205 of the drone 100 to further contain the effects of turbulence on the picking process in regions 204 in front of the picking faces 205.

As illustrated in FIGS. 1-4, the drone 100 may include at least one picking arm 101 that includes an end effector at its distal end to enable an individual item to be retrieved and moved to a different location. In some implementations, as shown best in FIGS. 1A and 3A, multiple picking arms 101 may extend laterally in opposite directions to allow for multiple product retrievals per assignment. Example picking arm assemblies 702, 802 that may be employed to support and manipulate the one or more picking arms 101 of the drone 100 are described below in connection with FIGS. 7A-B and 8A-C. The picking arm assembly 702 (shown in FIGS. 7A-B) includes a magnetic tip 704 as its end effector, whereas the picking arm assembly 802 (shown in FIGS. 8A-C) includes a suction cup 804 as its end effector.

Figure 1A:
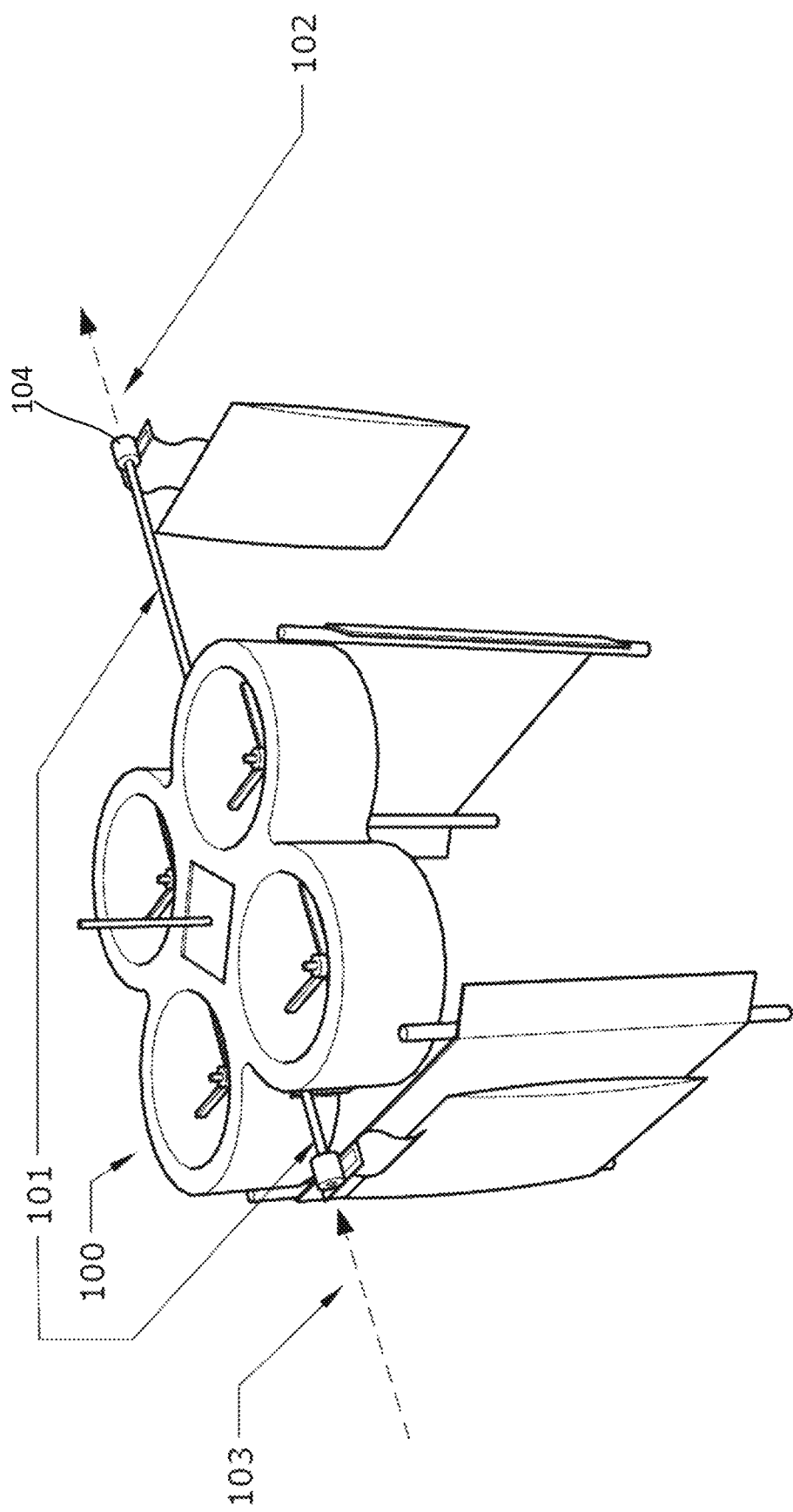
FIG. 1A shows a perspective view of a drone configured in accordance with some embodiments of the present disclosure.
Figure 4:
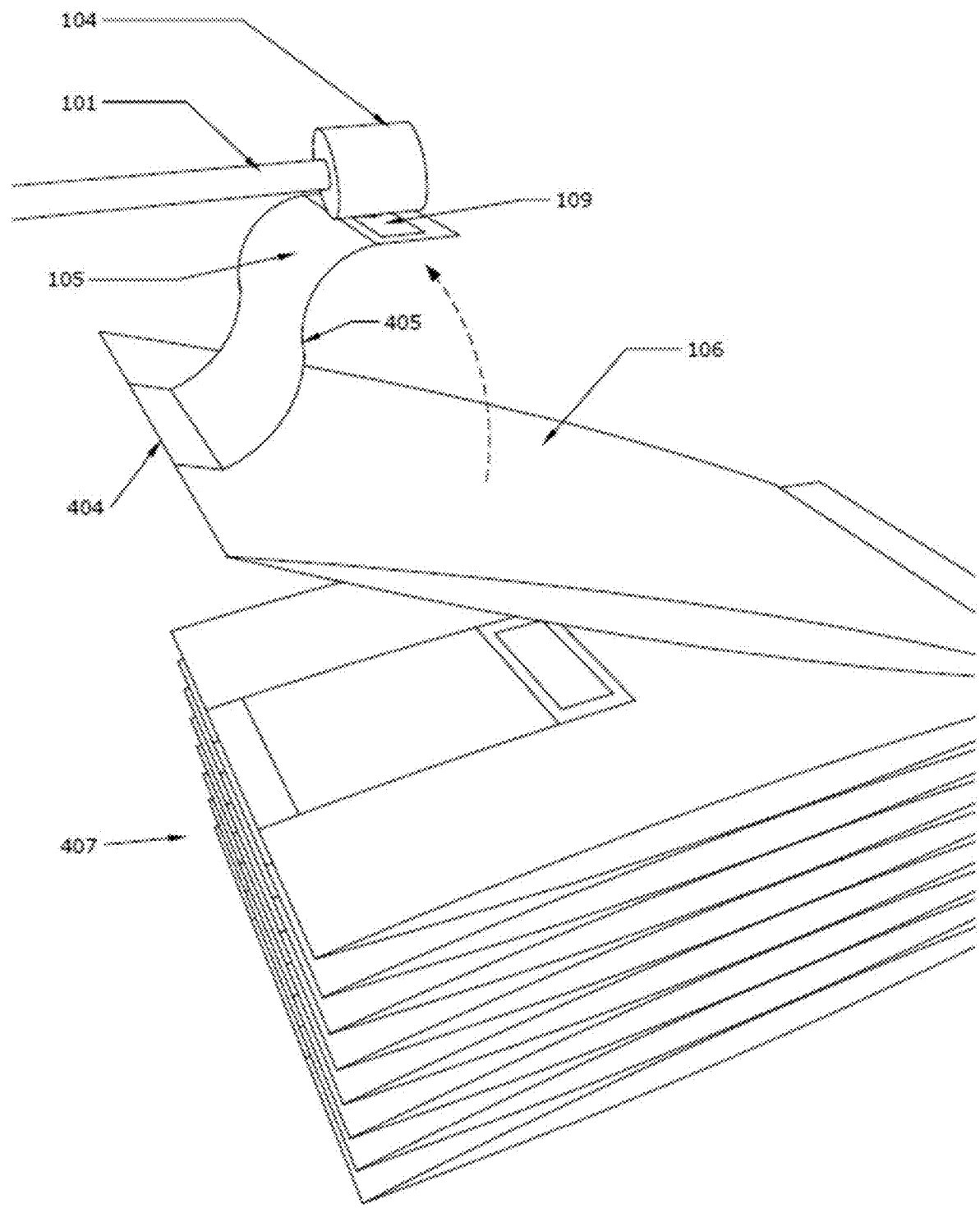
FIG. 4 shows details of a first example collection tag configured to enable a product to be retrieved by a drone such as that shown in FIG. 1A, in accordance with some embodiments of the present disclosure.

As shown in FIG. 1A, an individual picking arm 101 may be extended (102) in order to reach into a product bin and retracted (103) to bring the product 106 closer to the drone's center of gravity for stable transport to a drop destination, e.g., a pick cart containing order sorting bins, a conveyor belt, or a mobile ground robotic platform for further transport within the warehouse space. In some implementations, the distal end of a picking arm 101 may be equipped with a magnetic tip 104, 704 that can be used to attract a ferromagnetic component of a tag attached to an individual product 106. For instance, as shown in FIG. 4, in some implementations, a collection tag 105 attached to a product 106 (e.g., an item contained in a polyurethane bag or other packaging) may include a flexible lead 405 that has a ferromagnetic strip 109 disposed at its distal end. In other implementations, e.g., as shown in FIGS. 5A-B and 6A-B, a collection tag 502 may instead be configured as a thin disc (or other generally flat geometric shape, e.g., a square, a rectangle, etc.) including a ferromagnetic structure 504 (e.g., a layer of steel or a polymer, e.g., rubber, infused with ferrite powder or some other ferromagnetic material). Any of a number of other configurations of collection tags incorporating ferromagnetic components are also possible.

Figure 1C:
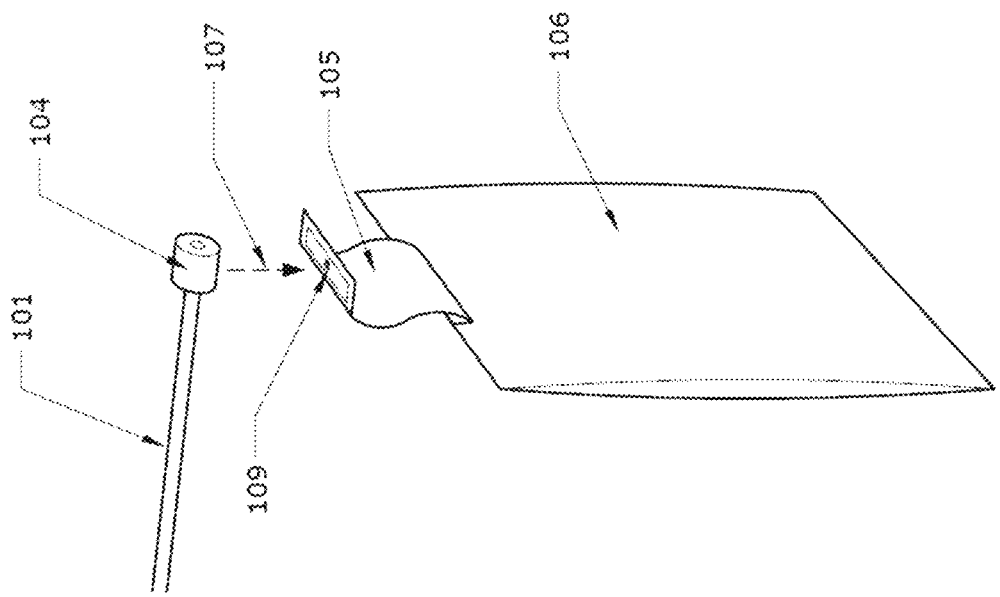
FIGS. 1B and 1C illustrate how the drone shown in FIG. 1A may pick up and drop a product, in accordance with some embodiments of the present disclosure.
Figure 1B:
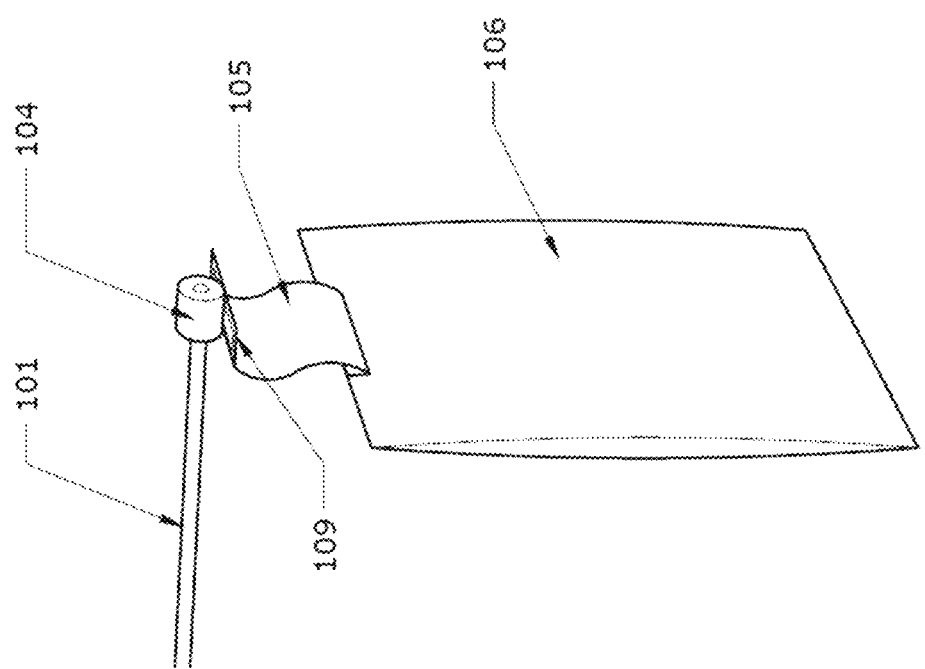

In some implementations, a magnetic tip 104, 704 of a picking arm 101 may include one or more electronically controllable components (e.g., one or more electro-magnets or switched magnetic devices) that can be activated to attract and adhere a ferromagnetic component of a collection tag 105, 502 (e.g., see FIG. 1B) and deactivated to release the tag and drop (107) the product 106 into the drop zone (see FIG. 1C). In other implementations, a magnetic tip 104, 704 of a picking arm 101 may additionally or alternatively include one or more permanent magnets.

Figure 7A:
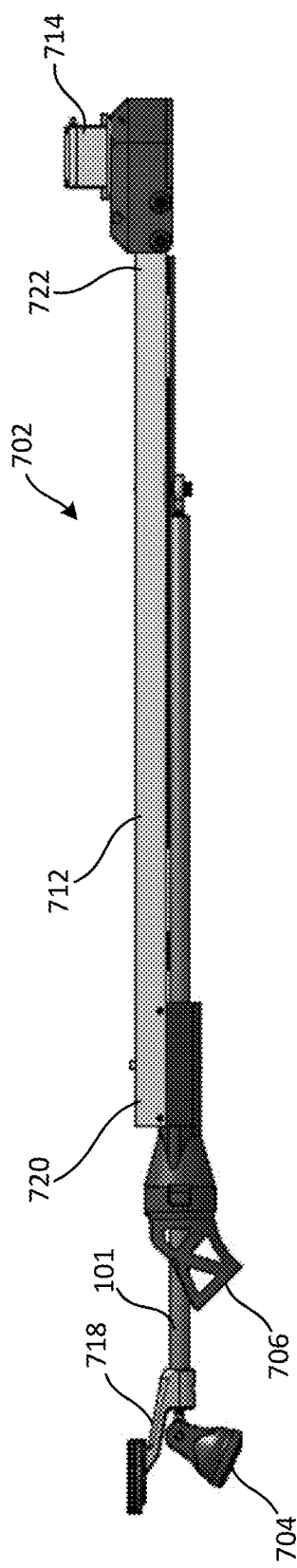
FIG. 7A shows a side view of a first example picking arm that may be employed by a drone such as that shown in FIG. 1A, in accordance with some embodiments of the present disclosure.
Figure 7B:
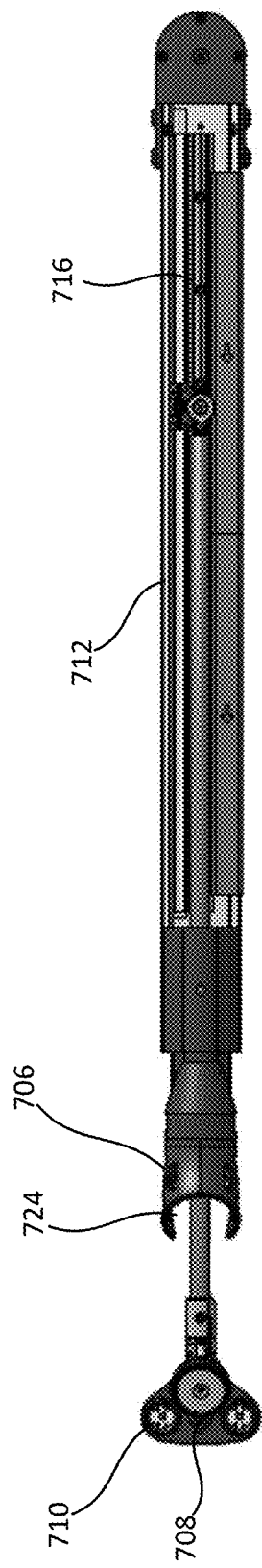
FIG. 7B shows a bottom view of the example picking arm shown in FIG. 7A.

As described below in connection with FIGS. 7A and 7B, in some implementations, a picking arm assembly 702 including a picking arm 101 may be fit with a component 706 (referred to herein as a "peeler") that is configured and arranged such that it forces a magnetic tip 104, 704 of the picking arm 101 to disengage from the ferromagnetic component 109, 504 of a collection tag 105, 502 when the distal end of the picking arm 101 is fully (or nearly fully) retracted toward the body of the drone 100. As noted above, in some implementations, in addition or in lieu of a magnetic tip 104, 704 the end effector of a picking arm 101 may include one or more suction cups 804. The picking arm assembly 802 described below in connection with FIGS. 8A-C, for example, incorporates an end effector that includes a suction cup 804 that is coupled to a vacuum motor 806 via pneumatic tubes 808, 810 and a solenoid valve 812. Although not illustrated in FIGS. 8A-C, in some implementations, the picking arm assembly 802 may also incorporate a peeler 706 that is configured and arranged such that it forces a suction cup 804 of the picking arm 101 to disengage from a product 106 when the distal end of the picking arm 101 is fully (or nearly fully) retracted toward the body of the drone 100.

Figure 3A:
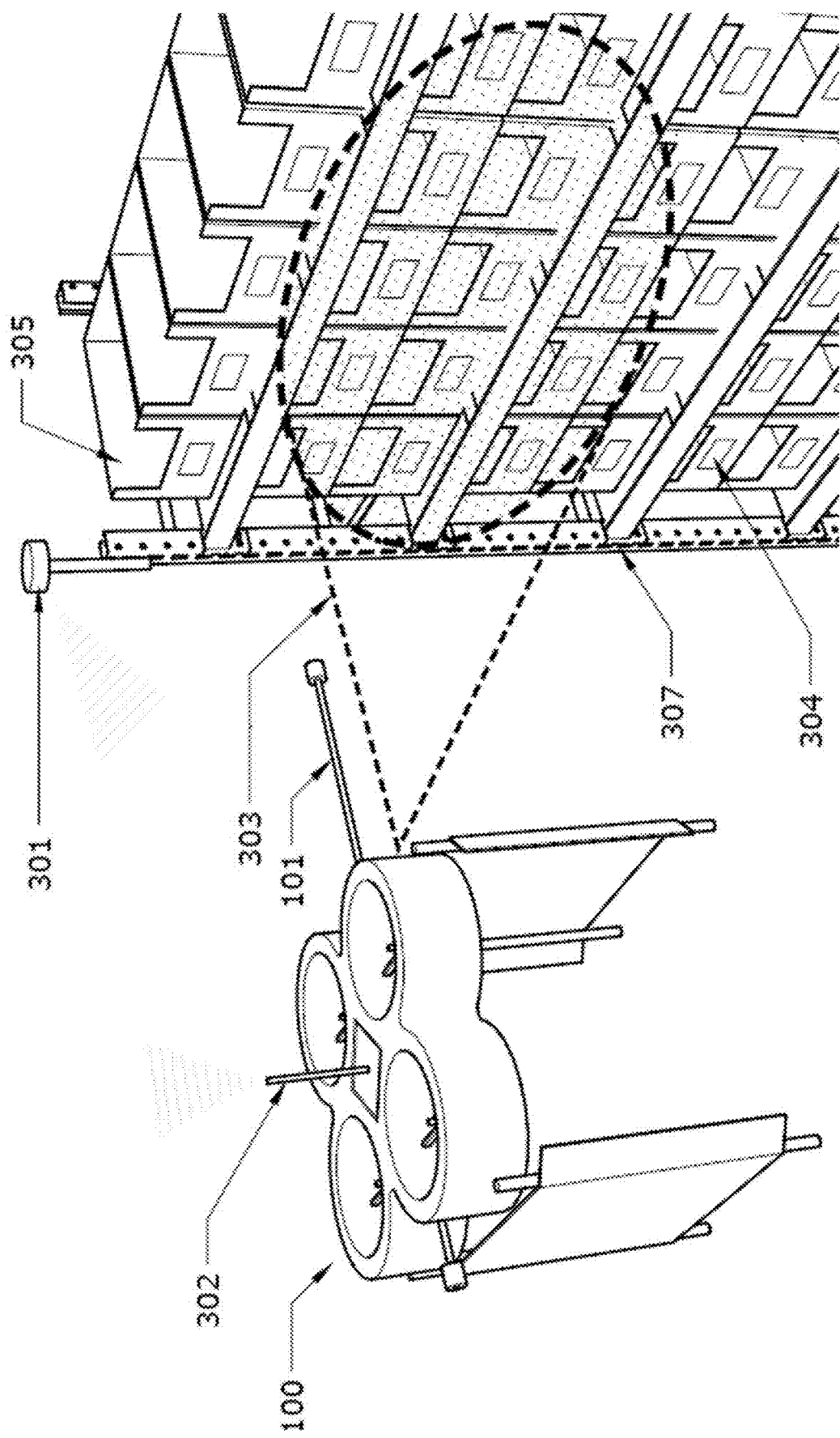
FIGS. 3A and 3B illustrate navigation capabilities of the drone shown in FIG. 1A, in accordance with some embodiments of the present disclosure.
Figure 3B:
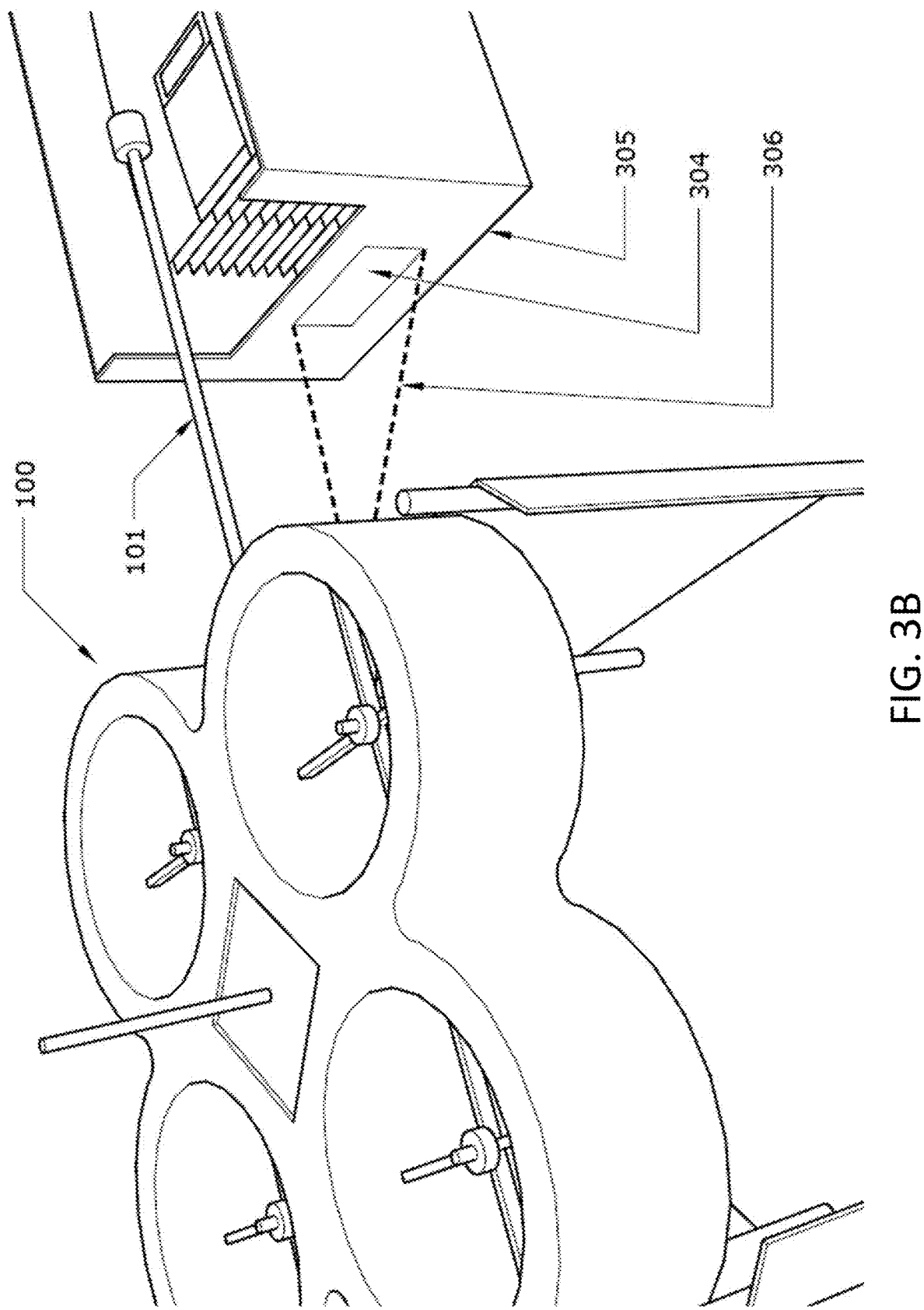

As described in more detail below in connection with FIG. 9, the drone 100 may be equipped with one or more ranging transceivers 906, 908 and other sensors 916, 928 that enable it to complete its assignment in a complex and changing physical environment, and in concert with its fleet companions in surrounding flight patterns. Further, one or more radio transceivers 936, 930 may connect the drone 100 via WIFI, cellular protocol, or the like to a central system (e.g., via one or more antennas 302), aiding in positioning and flight path instruction. As shown in FIG. 3A, in some implementations, one or more beacons 301 (e.g., acoustic beacons) may be distributed within the warehouse to enable one or more sensors of the drone 100 to detect and use the beacons 301 to triangulate the drone's position within the facility. The drone 100 may additionally or alternatively be equipped with one or more digital cameras 910, 912, 922 to provide streams of visual data representing fields of view 303, 306 that can be used to determine position, movement, proximity to other objects, and to identify racks 307, specific bins 305, and individual products 106.

As shown in FIG. 4, in some implementations, a collection tag 105 may be affixed to each product 106 in a stack 407 of products 106 within a bin 305. In some implementations, the collection tag 105 may include a flexible lead 405 and one end 404 of the flexible lead 405 may be adhered to the product 106. The flexibility of the flexible lead 405 may allow a ferromagnetic strip 109 at the end of the flexible lead 405 to be freely attracted and adhered to the controlled magnetic tip 104, 704 of the drone's picking arm 101. Additionally, in some implementations, the collection tag 105 may be embellished with a uniquely identifiable QR code or the like which can be read by the drone 100 for confirmation of the correct pick being made. Once the magnetic tip 104, 704 of the drone's picking arm 101 has made a connection with the ferromagnetic strip 109 of the collection tag 105, the product 106 may be lifted out of the bin 305 by way of arm retraction (103) and drone flight directional control.

Figure 5A:
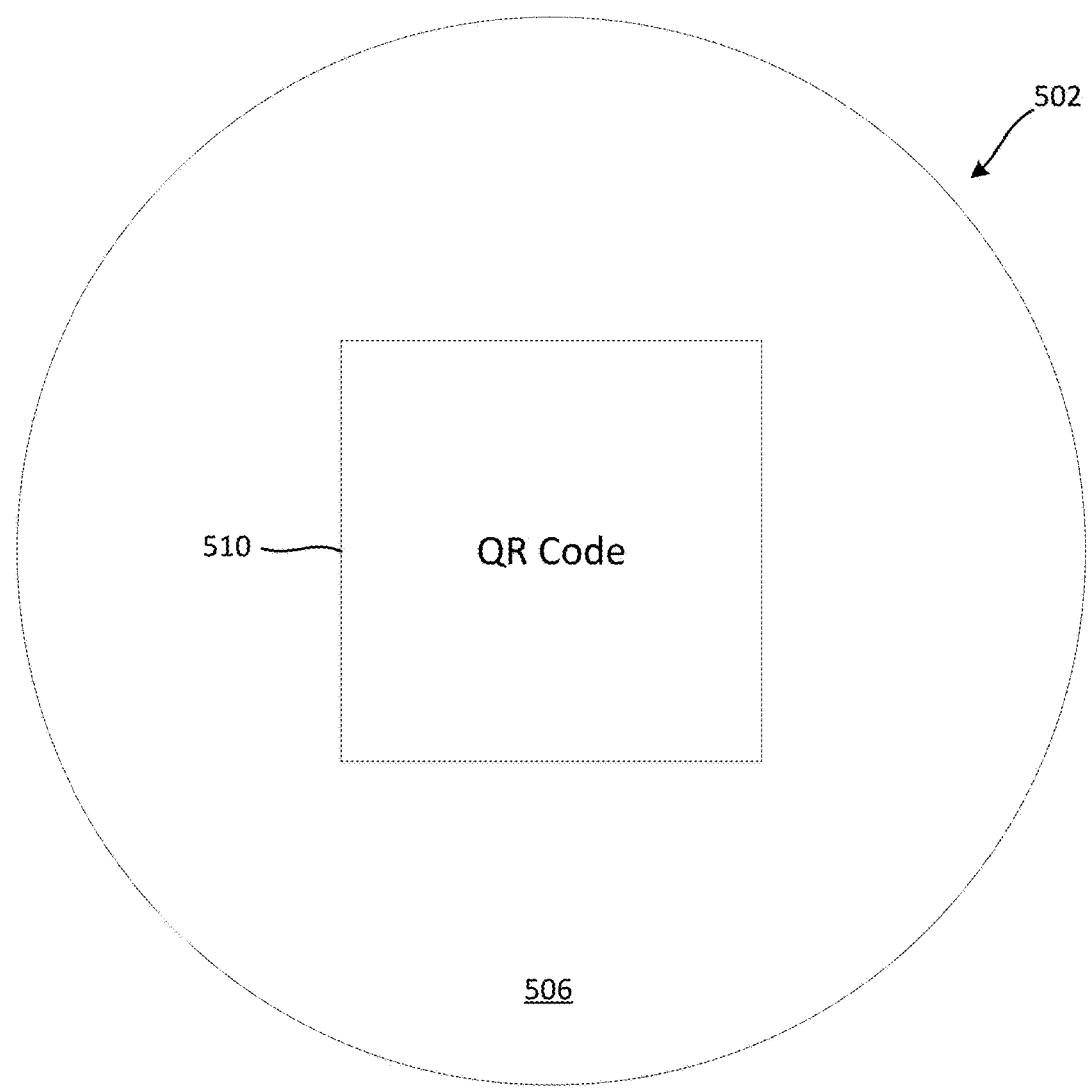
FIG. 5A shows a top view of a second example collection tag configured to enable a product to be retrieved by a drone such as that shown in FIG. 1A, in accordance with some embodiments of the present disclosure.
Figure 5B:
FIG. 5B shows a side view of the example collection tag shown in FIG. 5A.
Figure 6B:
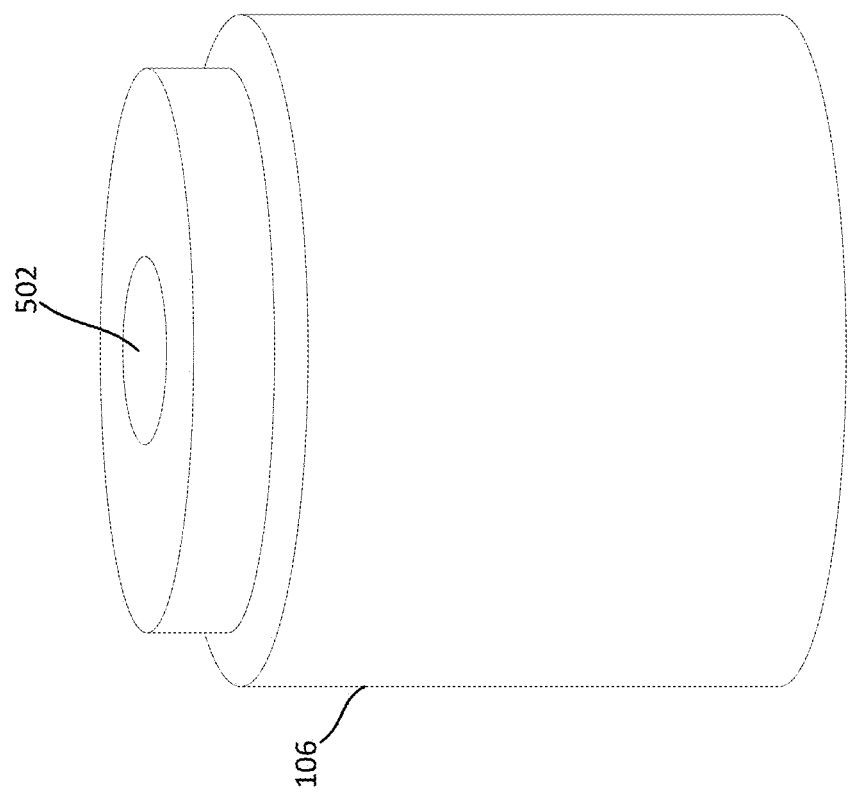
FIGS. 6A and 6B illustrate examples of how the collection tag shown in FIGS. 5A and 5B may be adhered to discrete products to enable such products to be retrieved by a drone such as that shown in FIG. 1A, in accordance with some embodiments of the present disclosure.
Figure 6A:
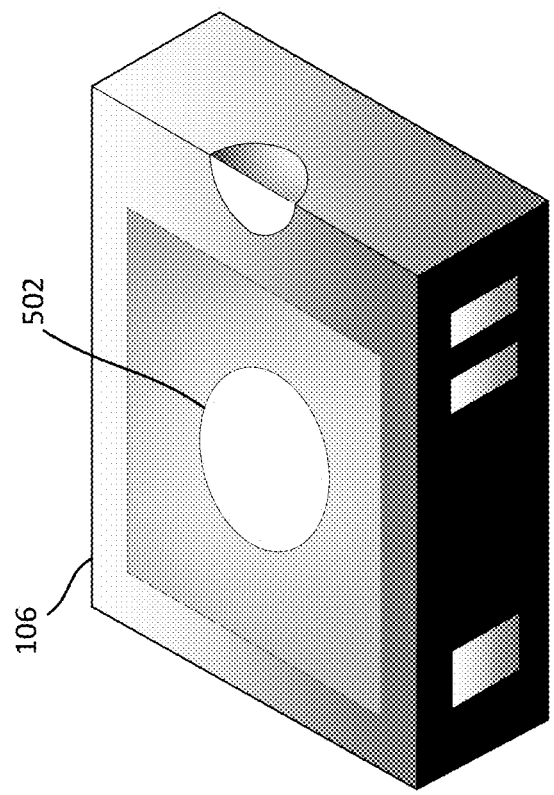

FIGS. 5A and 5B show a top view and a side view, respectively, of an example of another type of collection tag 502 that may be attached to a product 106. FIG. 6A illustrates how a collection tag 502 may, for example, be attached to a surface of discrete product 106 having a rectangular form factor. FIG. 6B illustrates how a collection tag 502 may, for example, be attached to a flat surface of discrete product 106 having a generally cylindrical form factor.

As shown in FIG. 5A, in some implementations, the collection tag 502 may include a ferromagnetic structure 504 disposed between a label layer 506 and an adhesive layer 508. In some implementations, the ferromagnetic structure 504 may include a thin disc of galvanized steel or ferritic stainless steel. In other implementations, the ferromagnetic structure 504 may include a polymer, e.g., rubber, infused with ferrite powder or some other ferromagnetic material and molded in the shape of a disc. It should be appreciated that, in other embodiments, the collection tag 502 may alternatively take on any of a number of different geometric shapes, e.g., a square, a rectangle, a triangle, a hexagon, etc., and the ferromagnetic structure 504 may be formed of any of a number of other ferromagnetic materials.

In some implementations, the label layer 506 may include a paper material, e.g., fluorescent paper, printed with a machine readable code, e.g., a stock keeping unit (SKU) code or otherwise, that uniquely identifies a type of product 106 within the warehouse. As shown in FIG. 5A, for example, the label layer 506 may have a quick response (QR) code 510 printed on it. As described in more detail below in connection with FIG. 7, in some implementations, a camera 708 may be disposed near or on the magnetic tip 704 of a picking arm 101 of the drone 100 to scan the QR code 510 of a collection tag 502 to ensure that the appropriate product 106 is being collected by the magnetic tip 704. As also described in connection with FIG. 7, one or more illumination sources 710, e.g., ultraviolet light emitting diodes (LEDs), may also be disposed near or on the magnetic tip 704 to illuminate the label layer 506 (e.g., by illuminating fluorescent paper on which the QR code is printed) to facilitate reading of the QR code 510 by the camera 708.

The adhesive layer 508 may include an adhesive material that can secure the collection tag 502 to the product 106 with at least enough force to enable to product 106 to be lifted and carried via the collection tag 502 after the ferromagnetic structure 504 has been attracted to the magnetic tip 104, 704.

The size of the collection tag 502 may be selected based on the size, shape, and weight of the product 106 that is to be retrieved. For instance, larger collection tags 502 that include higher quantities of ferromagnetic material within the ferromagnetic structures 504 may be used for heavier products 106 to ensure a magnetic tip 104, 704 is able to lift and carry such products 106 within a warehouse. Collection tags 502 with a diameter of approximately two inches may be adequate for most common products 106. In implementations in which the ferromagnetic structure 504 is formed of a steel material (e.g., gauge galvanized steel or ferritic stainless steel), the ferromagnetic structure 504 may have a thickness in a range, for example, between approximately 0.3 millimeters (mm) and 0.6 mm. In such implementations, it may be preferable for the ferromagnetic structure 504 to be greater than 0.3 mm to prevent the ferromagnetic structure 504 from having a potentially dangerous razor blade-like edge. In implementations in which the ferromagnetic structure 504 is formed of a polymer infused with ferromagnetic particles (e.g., a ferrite rubber material) the ferromagnetic structure 504 may have a thickness in a range, for example, between approximately 1.5 mm and 3.0 mm.

The example picking arm assembly 702 shown in FIGS. 7A-B will now be described. As shown, the picking arm assembly 702 may include a housing 712 configured to slidably engage with a picking arm 101 to enable the picking arm (and attached magnetic tip 704) to translate (left to right in FIGS. 7A-B) relative to the housing 712. As illustrated, in some implementations, the picking arm assembly 702 may include only a single motor 714 (e.g., a servo motor) positioned at a proximal end 722 of the housing 712 to drive the translation of the picking arm 101 relative to the housing 712, e.g., via a belt drive mechanism 716. As noted above, in some implementations, a camera 708 may be disposed near or on the magnetic tip 704 of a picking arm 101, e.g., by being mounted on a bracket 718 extending from the picking arm 101 (as shown in FIG. 7B) or perhaps by being integrated into the magnetic tip 704, to scan the QR code 510 of a collection tag 502 to ensure that the appropriate product 106 is being collected by the magnetic tip 704. In addition, one or more illumination sources 710, e.g., ultraviolet light emitting diodes (LEDs), may likewise be disposed near or on the magnetic tip 704, e.g., by being mounted on the arm 718 (as shown in FIG. 7B) or perhaps by being integrated into the magnetic tip 704, to illuminate the label layer 506 (e.g., by illuminating fluorescent paper on which the QR code is printed) to facilitate detection of the collection tag 502 within the dark bin and reading of the QR code 510 by the camera 708.

The peeler 706 may be attached at a distal end 720 of the housing 712. As illustrated, the peeler 706 may be configured such that retraction of the picking arm 101 toward the proximal end 722 of the housing 712 may cause the magnetic tip 704 to pass at least partially through an opening 724 formed by the peeler 706. When the picking arm 101 is retracted by a sufficient amount, a portion of the peeler 706 forming the opening 724 may engage a product 106 to which the magnetic tip 704 has attached (via a collection tag 105, 502) and force the magnetic tip 704 to detach from the collection tag 105, 502, thus causing the product 106 to be released from the magnetic tip 704.

The example picking arm assembly 802 shown in FIGS. 8A-C will now be described. As shown, similar to the picking arm assembly 702 shown in FIGS. 7A-B, the picking arm assembly 802 may include a housing 814 configured to slidably engage with a picking arm 101 to enable the picking arm 101 (and attached suction cup 804) to translate (left to right in FIG. 8C) relative to the housing 814, and a motor 816 (e.g., a servo motor) positioned at a proximal end 818 of the housing 814 to drive the translation of the picking arm 101 relative to the housing 814.

The picking arm assembly 802 may include a miniature vacuum pump motor 806 to generate negative pressure within a pneumatic tube 808 that is attached to a three way solenoid valve 812. The solenoid valve 812 may be switched to enable the vacuum generated by the vacuum motor 806 to be either (A) applied to the suction cup 804 via the pneumatic tube 810 to grasp a product 106 or (B) vented to cause the suction cup 804 to drop the product 106. The pneumatic tube 810 may be routed through the housing 814 in such a way to allow for free motion of the picking arm 101 relative to the housing 814.

The picking arm assembly 802 may further include a pressure sensor 820 mounted on the housing 814 adjacent of the vacuum motor 806. The vacuum motor 806 may be used, for example, to detect when a product 106 has been picked up by the suction cup 804 by monitoring the pressure in the pneumatic tubes 810. Various suction cups 804 may be used to support different package types. For example, in some implementations, standard national pipe taper (NPT) fittings may be mounted to the end of the picking arm 10 with a custom manifold block. Further, although not illustrated, the picking arm assembly 802 may also include other features of the 702, such as the camera 708 and the one or more illumination sources 710.

A fleet of the drones 100 may operate in three-dimensional space through a combination of centrally orchestrated flight assignment pathways delivered via a radio network, and on-board reactionary flight adjustments to negotiate unexpected variations within the environment. A drone 100 may use radio signals and/or positioning beacons 301 (see FIG. 3A) to traverse the warehouse at large, further refined by visual telemetry (e.g., within fields of view 303, 306) to identify target racks 307, bins 305, and individually tagged products 106 once the drone 100 is within proximity of each. The drone 100 may, for example, use visual telemetry to identify markers (e.g., marker 304 shown in FIG. 3B) on racks 307, bins 305, and products 106, and use such markers for precise positioning.

Figure 9:
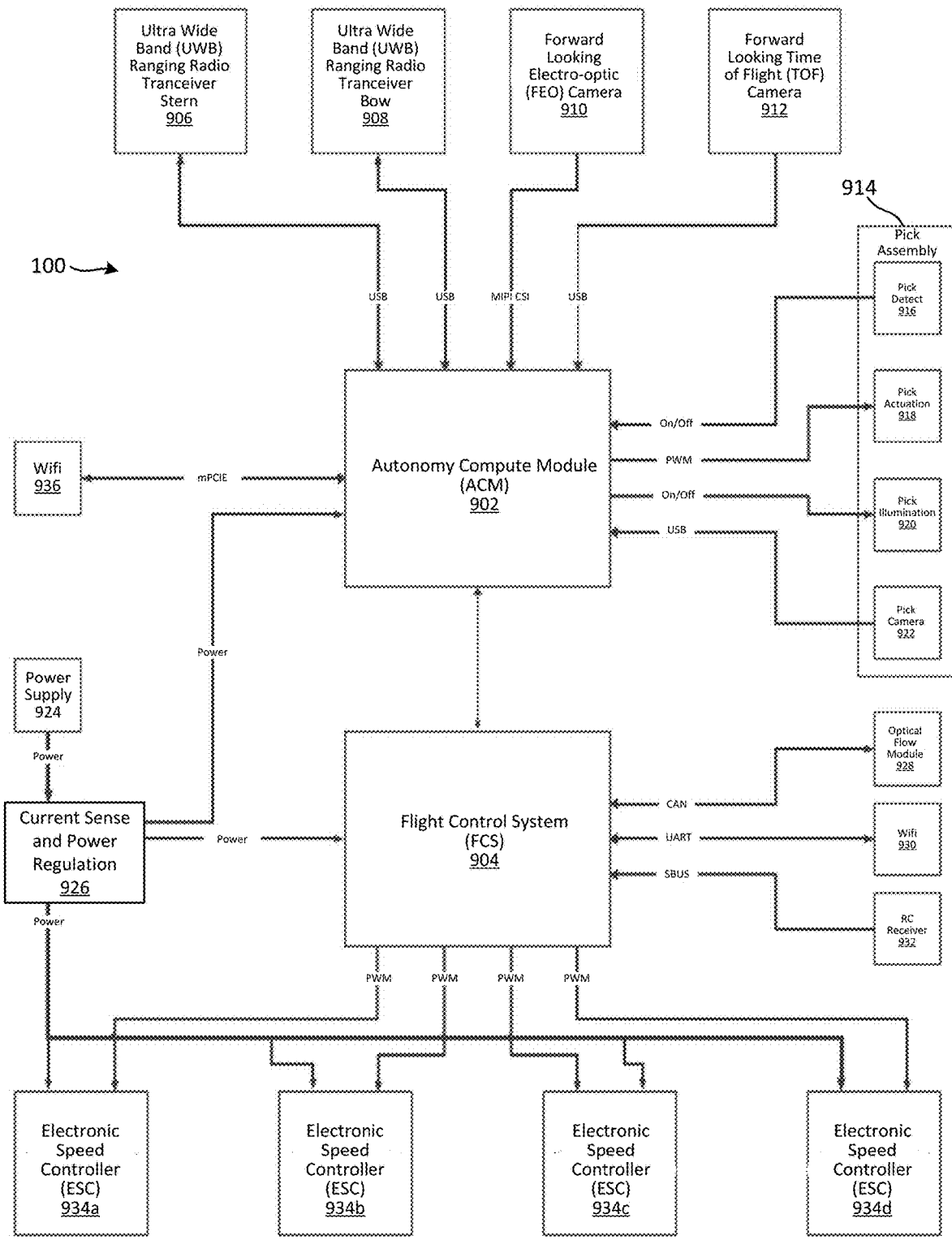
FIG. 9 is a system architecture diagram showing example components of a drone such as that shown in FIG. 1A, in accordance with some embodiments of the present disclosure.

FIG. 9 is system architecture diagram showing example components of a drone 100 in accordance with some embodiments of the present disclosure. As shown, in some implementations, a drone 100 may include an autonomy compute module (ACM) 902 and a flight control system (FCS) 904. Although not illustrated in FIG. 9, it should be appreciated that, in some implementations, the ACM 902 and the FCS 904 may each include one or more processors and one or more computer readable mediums encoded with instructions which, when executed by the one or more processors, implement the various functionality and operations described herein. The ACM 902 may be responsible for controlling the autonomous behavior of the drone 100, such as by receiving (e.g., via one or more radio transceivers 936) a mission plan relating to the retrieval of a particular product 106 from bin 305 of a rack 307 and delivery of the retrieved product 106 to a particular drop point and using various sensors and actuators on the drone 100 to execute that mission plan. The FCS 904 may be responsible for controlling the electronic speed controllers 934a, 934b, 934c, 934d associated with respective propellers of the drone to navigate the drone 100 about the warehouse in accordance with directives from the ACM 902. As illustrated, the FCS 904 may interact with one or more optical flow modules 928 (e.g., LIDAR sensors), one or more radio transceivers 930, and one or more radio control (RC) receivers 932 to implement its functionality.

As illustrated in FIG. 9, the ACM 902 may employ one or more ultrawide band (UWB) ranging radio transceivers 906, 908, a forward looking electro-optic (FEO) camera 910, and a forward looking time of flight (TOF) camera 912 to facilitate wireless positioning and execution of a received mission plan. As also illustrated, the ACM 902 may additionally interact with various components of a pick assembly 914 (e.g., the picking arm assembly 702 or the picking arm assembly 802) to cause the drone to retrieve and drop a product 106 in accordance with a mission plan. As shown, the pick assembly 914 may include a pick detect component 916 (e.g., the pressure sensor 820 of the picking arm assembly 802 shown in FIGS. 8A-C), a pick actuation component 918 (e.g., the motor 714 of the picking arm assembly 702 shown in FIGS. 7A-B or the motor 816 of the picking arm assembly 802 shown in FIGS. 8A-C, and perhaps an electromagnet or switched magnet component of a magnetic tip 104, 704 or the solenoid valve 812 of the picking arm assembly 802 shown in FIGS. 8A-C), a pick illumination component 920 (e.g., the one or more illumination sources 710 of the picking arm assembly 702 shown in FIGS. 7A-B), and a pick camera 922 (e.g., the camera 708 of the picking arm assembly 702 shown in FIGS. 7A-B).

Figure 10:
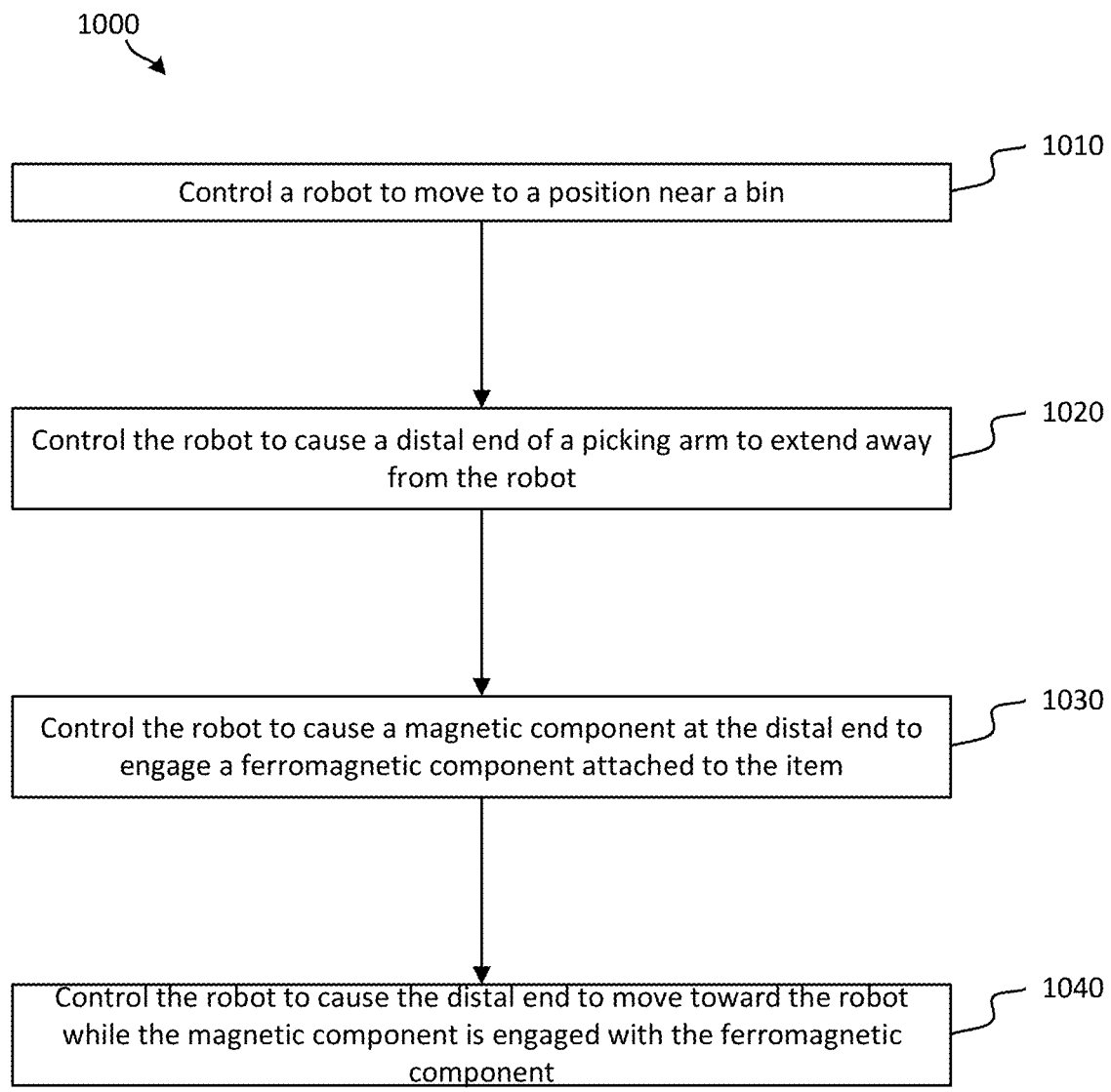
FIG. 10 is a flow chart showing a first example method that may be performed to retrieve an item from a bin, in accordance with some embodiments of the present disclosure.

FIG. 10 is a flow chart showing a first example method 1000 that may be performed to retrieve an item (e.g., an item 106) from a bin (e.g., the bin 305 shown in FIGS. 3A and 3B) in accordance with some embodiments of the present disclosure.

At step 1010, a robot (e.g., the drone 100 or another type of robot capable of moving in some other way, e.g., via wheels, articulated limbs, etc.) may be controlled (e.g., by using the FCS 904 to interact with the electronic speed controllers 934a-934d) to move to a position near a bin.

At step 1020, the robot may be controlled (e.g., by using the ACM 902 to interact with the pick actuation component 918) to cause a distal end of a picking arm (e.g., the picking arm 101) to extend away from the drone.

At step 1030, the robot may be controlled to cause a magnetic component (e.g., the magnetic tip 104, 704) at the distal end to engage a ferromagnetic component (e.g., the ferromagnetic structure 504 of the collection tag 502) attached to the item.

At step 1040, the robot may be controlled to cause the distal end to move toward the robot while the magnetic component (e.g., the magnetic tip 104, 704) is engaged with the ferromagnetic component (e.g., the ferromagnetic structure 504 of the collection tag 502).

Figure 11:
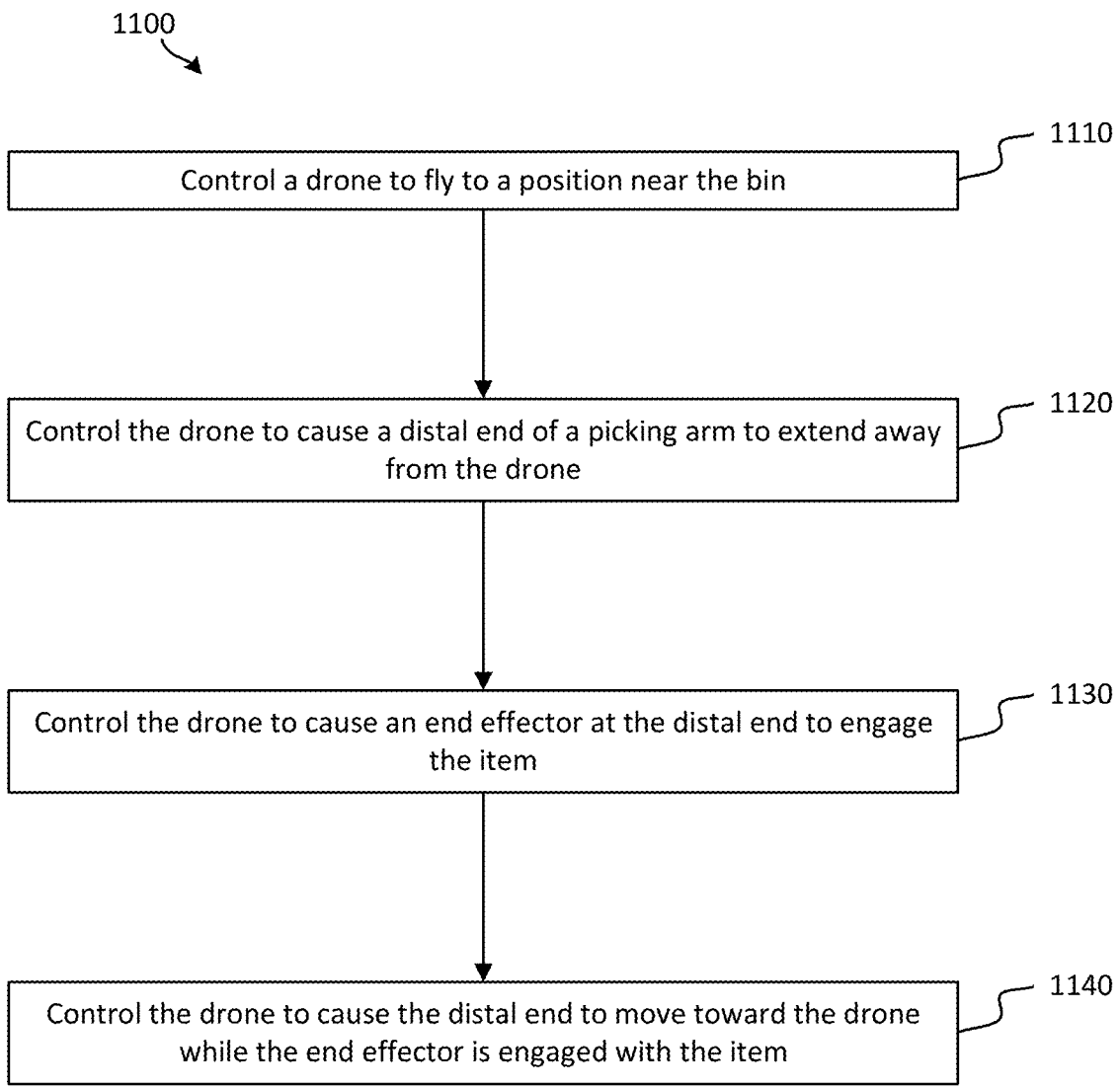
FIG. 11 is a flow chart showing a second example method that may be performed to retrieve an item from a bin, in accordance with some embodiments of the present disclosure.

FIG. 11. is a flow chart showing a second example method 1100 that may be performed to retrieve an item (e.g., an item 106) from a bin (e.g., the bin 305 shown in FIGS. 3A and 3B) in accordance with some embodiments of the present disclosure.

At step 1110, a drone (e.g., the drone 100) may be controlled (e.g., by using the FCS 904 to interact with the electronic speed controllers 934a-934d) to fly to a position near the bin.

At step 1120, the drone (e.g., the drone 100) may be controlled (e.g., by using the ACM 902 to interact with the pick actuation component 918) to cause a distal end of a picking arm (e.g., the picking arm 101) to extend away from the drone.

At step 1130, the drone (e.g., the drone 100) may be controlled to cause an end effector (e.g., a magnetic tip 104, 704 or a suction cup 804) at the distal end to engage the item.

At step 1140, the drone (e.g., the drone 100) may be controlled (e.g., by using the ACM 902 to interact with the pick actuation component 918) to cause the distal end to move toward the drone while the end effector is engaged with the item.

Figure 12:
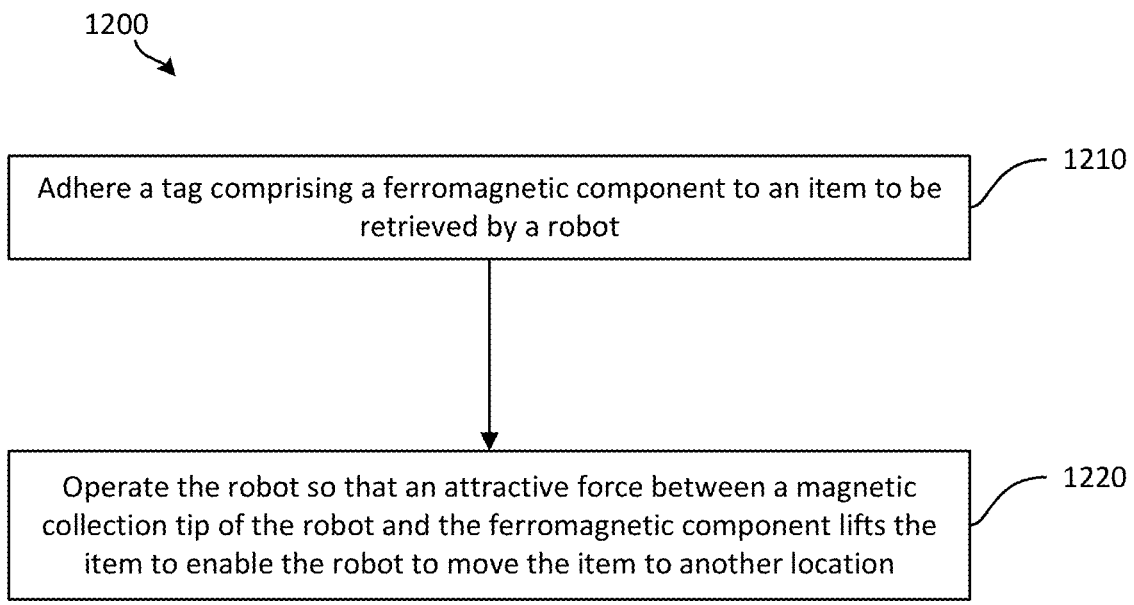
FIG. 12 is a flow chart of an example method that may be performed using a tag and a drone, in accordance with some embodiments of the present disclosure.

FIG. 12 is a flow chart of an example method 1200 that may be performed using a tag (e.g., the tag 506 shown in FIGS. 5A and 5B) and a robot (e.g., the drone 100 or another type of robot capable of moving in some other way, e.g., via wheels, articulated limbs, etc.) in accordance with some embodiments of the present disclosure.

At step 1210, a tag (e.g., the tag 506 shown in FIGS. 5A and 5B) may be adhered to an item (e.g., the item 106) to be retrieved by a robot (e.g., the drone 100 or another type of robot capable of moving in some other way, e.g., via wheels, articulated limbs, etc.), where the tag includes a ferromagnetic component (e.g., the ferromagnetic structure 504).

At step 1220, the robot may be operated so that an attractive force between a magnetic collection tip (e.g., the magnetic tip 104, 704) of the robot and the ferromagnetic component (e.g., the ferromagnetic structure 504) lifts the item to enable the robot to move the item to another location.

The following clauses describe various salient features of the present disclosure.

Clause A1. A method for retrieving an item from a bin, comprising: controlling a robot to move to a position near the bin; controlling the robot to cause a distal end of a picking arm to extend away from the robot; controlling the robot to cause a magnetic component at the distal end of the picking arm to engage a ferromagnetic component attached to the item; and controlling the robot to cause the distal end to move toward the robot while the magnetic component is engaged with the ferromagnetic component.

Clause A2. The method of clause A1, wherein: the ferromagnetic component is included in a tag adhered to packaging of the item using an adhesive.

Clause A3. The method of clause A2, further comprising: using one or more sensors of the robot to detect the tag in the bin and read a code on the tag; and determining, by the robot, that the code corresponds to the item.

Clause A4. The method of clause A2 or clause A3, wherein the tag includes a fluorescent material, and the method further comprises: using an ultraviolet light source on the robot to illuminate fluorescent material.

Clause A5. The method of any of clauses A2 through A4, further comprising: controlling the robot to cause the distal end to move toward the robot until the tag contacts a portion the robot that is configured to engage the tag, thus causing the permanent magnet to release the item.

Clause A6. The method of any of clauses A1 through A5, wherein the magnetic component comprises an electromagnet which is selectively energized to engage or disengage from the ferromagnetic component.

Clause A7. The method of any of clauses A1 through A6, wherein the ferromagnetic component comprises gauge steel or a polymer embedded with a ferromagnetic material.

Clause A8. The method of any of clauses A1 through A7, wherein the magnetic component comprises a permanent magnet.

Clause A9. The method of any of clauses A1 through A8, wherein the robot comprises a drone, and controlling the robot to move to the position comprises: controlling one or more propellers of the drone to cause the drone to fly to the position.

Clause B1. A service drone, comprising: a frame; one or more propellers coupled to the frame; one or more first motors configured to drive the one or more propellers to provide thrust to navigate the service drone within an environment; a picking arm coupled to the frame, the picking arm having a distal end; an end effector coupled to the distal end; one or more second motors configured to cause the distal end to move relative to the frame; and one or more processors configured to carry out an assigned mission to retrieve an item from a bin by (A) controlling the one or more first motors to navigate the service drone to the bin, (B) controlling the one or more second motors to cause the distal end to be moved away from the frame to enable the end effector to engage the item, and (C) controlling the one or more second motors to cause the distal end to be moved toward the frame while the end effector is engaged with the item.

Clause B2. The service drone of clause B1, wherein: the end effector comprises a permanent magnet adapted to engage a ferromagnetic component of a tag adhered to the item.

Clause B3. The service drone of clause B2, further comprising: a member configured and arranged on the frame to contact the item when the one or more second motors cause the distal end to move close to the frame, thus causing the ferromagnetic component of the tag to become disengaged from the permanent magnet.

Clause B4. The service drone of clause B1, wherein: the end effector comprises an electromagnet; and the one or more processors are further configured to control the electromagnet to cause the electromagnet to selectively engage or disengage from a ferromagnetic component of a tag adhered to the item.

Clause B5. The service drone of clause B1, wherein the end effector comprises one or more suction cups adapted to engage a surface of the item.

Clause B6. The service drone of any of clauses B1 through B5, further comprising a camera and an illumination source coupled to the distal end of the picking arm to read a code on the item.

Clause B7. The service drone of clause B6, wherein the illumination source comprises an ultraviolet light.

Clause C1. A tag for use with a robot collection system, comprising: a ferromagnetic component configured to be attracted to a magnetic collection tip of a robot; and an adhesive surface for securing the tag to an item.

Clause C2. The tag of clause C1, further comprising: a label supported by the ferromagnetic component, the label including a representation of a computer-readable code corresponding to the item.

Clause C3. The tag of clause C21, wherein the label comprises a fluorescent material.

Clause C4. The tag of clause C2 or clause C3, wherein the computer-readable code comprises a bar code or a quick response code.

Clause C5. The tag of any of clauses C1 through C4, wherein the ferromagnetic component comprises gauge galvanized steel or ferritic stainless steel.

Clause C6. The tag of any of clauses C1 through C4, wherein the ferromagnetic component comprises a polymer embedded with ferromagnetic particles.

Clause C7. The tag of any of clauses C1 through C6, further comprising a flexible lead, wherein: the ferromagnetic component is disposed at a first end of the flexible lead; and the adhesive surface is disposed at a second end of the flexible lead opposite the first end.

Clause D1. A method, comprising: adhering a tag comprising a ferromagnetic component to an item to be retrieved by a robot; and operating the robot so that an attractive force between a magnetic collection tip of the robot and the ferromagnetic component lifts the item to enable the robot to move the item to another location.

Clause D2. The method of clause D1, wherein the ferromagnetic component comprises gauge steel or a polymer embedded with a ferromagnetic material.

Clause D3. The method of clause D1 or clause D2, wherein the item is disposed in a bin, and the method further comprises: using one or more sensors of the robot to detect the tag in the bin and read a code on the tag; and determining, by the robot, that the code corresponds to the item.

Clause D4. The method of any of clauses D1 through D3, wherein the tag includes a fluorescent material, and the method further comprises: using an ultraviolet light source on the robot to illuminate fluorescent material.

Clause D5. The method of any of clauses D1 through D4, wherein the magnetic collection tip comprises a permanent magnet.

Clause D6. The method of any of clauses D1 through D4, wherein the magnetic collection tip comprises an electromagnet, and the method further comprises: operating the electromagnet to selectively generate the attractive force between the magnetic collection tip and the ferromagnetic component of the tag.

Clause D7. The method of any of clauses D1 through D6, wherein the robot comprises a drone, and the method further comprises: controlling one or more propellers of the drone to cause the drone to fly to a first position near the item; and controlling the one or more propellers to cause the drone to fly from the first position to a drop destination for the item.

Clause E1. A method for retrieving an item from a bin, comprising: controlling a robot to move to a position near the bin; controlling the robot to cause a distal end of a picking arm to extend away from the robot; controlling the robot to cause a magnetic component at the distal end to engage a ferromagnetic component attached to the item; and controlling the robot to cause the distal end to move toward the robot while the magnetic component is engaged with the ferromagnetic component.

Clause E2. The method of clause E1, wherein the robot comprises a drone, and controlling the robot to move to the position comprises: controlling one or more propellers of the drone to fly to the position.

Clause E3. The method of clause E1 or clause E2, further comprising: adhering the ferromagnetic component to the item using an adhesive.

Clause E4. The method of any of clauses E1 through E3, further comprising: using one or more sensors of the robot to read a code associated with the ferromagnetic component; and determining, by the robot, that the code corresponds to the item.

Clause E5. The method of clause E4, wherein the code comprises a bar code or quick response code printed on a label supported by the ferromagnetic component.

Clause E6. The method of clause E5, wherein the label comprises a fluorescent material.

Clause E7. The method of clause E6, further comprising: using an ultraviolet light coupled to the distal end of the picking arm to illuminate the fluorescent material.

Clause E8. The method of any of clauses E4 through E7, further comprising: using an illumination source coupled to the distal end of the picking arm to illuminate the code.

Clause E9. The method of any of clauses E1 through E8, wherein the ferromagnetic component comprises a steel tag.

Clause E10. The method of clause E9, wherein the steel tag comprises gauge galvanized steel or ferritic stainless steel.

Clause E11. The method of any of clauses E1 through E8, wherein the ferromagnetic component comprise a polymer tag embedded with ferromagnetic particles.

Clause E12. The method of clause E11, wherein the polymer tag comprises an elastomer polymer.

Clause E13. The method of any of clauses E1 through E12, further comprising: controlling the robot to cause the distal end to move toward the robot until the item contacts a portion of the robot, thus causing the ferromagnetic component to become disengaged from the magnetic component.

Clause E14. The method of any of clauses E1 through E13, wherein the magnetic component comprises a permanent magnet.

Clause E15. The method of clause E14, wherein the permanent magnet comprises multiple poles of alternating polarity.

Clause E16. The method of any of clauses E1 through E12, wherein the magnetic component comprises an electromagnet.

Clause E17. The method of clause E16, further comprising: controlling the electromagnet to selectively disengage from the ferromagnetic component.

Clause E18. The method of any of clauses E1 through E12, wherein the magnetic component comprises a magnetic switchable device.

Clause E19. The method of clause E18, further comprising: controlling the magnetic switchable device to selectively disengage from the ferromagnetic component.

Clause F1. A method for retrieving an item from a bin, comprising: controlling a drone to fly to a position near the bin; controlling the drone to cause a distal end of a picking arm to extend away from the drone; controlling the drone to cause an end effector at the distal end to engage the item; and controlling the drone to cause the distal end to move toward the drone while the end effector is engaged with the item.

Clause F2. The method of clause F1, wherein: the end effector comprises a magnetic component adapted to engage a ferromagnetic component attached to the item.

Clause F3. The method of clause F2, further comprising: adhering the ferromagnetic component to the item using an adhesive.

Clause F4. The method of clause F2 or clause F3, further comprising: using one or more sensors of the drone to read a code associated with the ferromagnetic component; and determining, by the drone, that the code corresponds to the item.

Clause F5. The method of clause F4, wherein the code comprises a bar code or quick response code printed on a label supported by the ferromagnetic component.

Clause F6. The method of clause F5, wherein the label comprises a fluorescent material.

Clause F7. The method of clause F6, further comprising: using an ultraviolet light coupled to the distal end of the picking arm to illuminate the fluorescent material.

Clause F8. The method of any of clauses F4 through F7, further comprising: using an illumination source coupled to the distal end of the picking arm to illuminate the code.

Clause F9. The method of any of clauses F2 through F8, wherein the ferromagnetic component comprises a steel tag.

Clause F10. The method of clause F9, wherein the steel tag comprises gauge galvanized steel or ferritic stainless steel.

Clause F11. The method of any of clauses F2 through F8, wherein the ferromagnetic component comprise a polymer tag embedded with ferromagnetic particles.

Clause F12. The method of clause F11, wherein the polymer tag comprises an elastomer polymer.

Clause F13. The method of any of clauses F2 through F12, wherein the magnetic component comprises a permanent magnet.

Clause F14. The method of clause F13, wherein the permanent magnet comprises multiple poles of alternating polarity.

Clause F15. The method of any of clauses F2 through F12, wherein the magnetic component comprises an electromagnet configured to engage the ferromagnetic component.

Clause F16. The method of clause F15, further comprising: controlling the electromagnet to cause the end effector to selectively disengage from the ferromagnetic component.

Clause F17. The method of any of clauses F2 through F12, wherein the end effector comprises a magnetic switchable device configured to engage the ferromagnetic component.

Clause F18. The method of clause F17, further comprising: controlling the magnetic switchable device to cause the end effector to selectively disengage from the ferromagnetic component.

Clause F19. The method of clause F1, wherein the end effector comprises one or more suction cups adapted to engage a surface of the item.

Clause F20. The method of any of clauses F1 through F19, further comprising: controlling the drone to cause the distal end to move toward the drone until the item contacts a portion of the drone, thus causing the item to become disengaged from the end effector.

Clause G1. A service drone, comprising: a frame; one or more propellers coupled to the frame; one or more first motors configured to drive the one or more propellers to provide thrust to navigate the service drone within an environment; a picking arm coupled to the frame, the picking arm having a distal end; an end effector coupled to the distal end; one or more second motors configured to cause the distal end to move relative to the frame; and one or more processors configured to carry out an assigned mission to retrieve an item from a bin by (A) controlling the one or more first motors to navigate the service drone to the bin, (B) controlling the one or more second motors to cause the distal end to be moved away from the frame to enable the end effector to engage the item, and (C) controlling the one or more second motors to cause the distal end to be moved toward the frame while the end effector is engaged with the item.

Clause G2. The service drone of clause G1, wherein: the end effector comprises a magnetic component adapted to engage a ferromagnetic component attached to the item.

Clause G3. The service drone of clause G2, in combination with the ferromagnetic component, wherein the ferromagnetic component is adhered to the item via an adhesive.

Clause G4. The combination of clause G3, further comprising: one or more sensors configured to read a code of the ferromagnetic component; and the one or more processors are further configured to determine that the code corresponds to the item.

Clause G5. The combination of clause G4, wherein the code comprises a bar code or quick response code printed on a label supported by the ferromagnetic component.

Clause G6. The combination of clause G5, wherein the label comprises a fluorescent material.

Clause G7. The combination of clause G6, further comprising: an ultraviolet light coupled to the distal end of the picking arm to illuminate the fluorescent material.

Clause G8. The combination of any of clauses G3 through G7, wherein the ferromagnetic component comprises a steel tag.

Clause G9. The combination of clause G8, wherein the steel tag comprises gauge galvanized steel or ferritic stainless steel.

Clause G10. The combination of any of clauses G3 through G7, wherein the ferromagnetic component comprise a polymer tag embedded with ferromagnetic particles.

Clause G11. The combination of clause G10, wherein the polymer tag comprises an elastomer polymer.

Clause G12. The service drone of any of clauses G2 through G11, wherein the magnetic component comprises a permanent magnet.

Clause G13. The service drone of clause G12, wherein the permanent magnet comprises multiple poles of alternating polarity.

Clause G14. The service drone of any of clauses G2 through G11, wherein the magnetic component comprises an electromagnet configured to engage the ferromagnetic component.

Clause G15. The service drone of clause G14, wherein the one or more processors are further configured to control the electromagnet to cause the end effector to selectively disengage from the ferromagnetic component.

Clause G16. The service drone of any of clauses G2 through G11, wherein the magnetic component comprises a magnetic switchable device configured to engage the ferromagnetic component.

Clause G17. The service drone of clause G16, wherein the one or more processors are further configured to control the magnetic switchable device to cause the end effector to selectively disengage from the ferromagnetic component.

Clause G18. The service drone of clause G1, wherein the end effector comprises one or more suction cups adapted to engage a surface of the item.

Clause G19. The service drone of any of clauses G1 through G18, further comprising a camera coupled to the distal end of the picking arm to read a code on the item.

Clause G20. The service drone of clause G19, further comprising an illumination source coupled to the distal end of the picking arm to illuminate the code.

Clause G21. The service drone of clause G20, wherein the illumination source comprises an ultraviolet light.

Clause G22. The service drone of any of clauses G1 through G21, further comprising: a member configured and arranged on the frame to contact the item when the one or more second motors cause the distal end to move close to the frame, thus causing the item to become disengaged from the end effector.

Clause H1. A collection tag for use with a robot, comprising: a ferromagnetic component configured to be attracted to a magnetic collection tip of the robot; and an adhesive surface for securing the collection tag to an item to be retrieved by the robot using the magnetic collection tip.

Clause H2. The collection tag of clause H1, further comprising: a label supported by the ferromagnetic component, the label including a representation of a computer-readable code corresponding to the item.

Clause H3. The collection tag of clause H2, wherein the label comprises a fluorescent material.

Clause H4. The collection tag of clause H1 or clause H2, wherein the computer-readable code comprises a bar code or a quick response code.

Clause H5. The collection tag of any of clauses H1 through H4, wherein the ferromagnetic component comprises a steel tag.

Clause H6. The collection tag of clause H5, wherein the steel tag comprises gauge galvanized steel or ferritic stainless steel.

Clause H7. The collection tag of any of clauses H1 through H4, wherein the ferromagnetic component comprise a polymer tag embedded with ferromagnetic particles.

Clause H8. The collection tag of clause H7, wherein the polymer tag comprises an elastomer polymer.

Clause H9. The collection tag of any of clauses H1 through H8, further comprising a flexible lead, wherein: the ferromagnetic component is disposed at a first end of the flexible lead; and the adhesive surface is disposed at a second end of the flexible lead opposite the first end.

Clause I1. A method, comprising: adhering a tag comprising a ferromagnetic component to an item to be retrieved by a robot; and operating the robot so that an attractive force between a magnetic collection tip of the robot and the ferromagnetic component lifts the item to enable the robot to move the item to another location.

Clause I2. The method of clause I1, further comprising: using one or more sensors of the robot to read a code associated with the ferromagnetic component; and determining, by the robot, that the code corresponds to the item.

Clause I3. The method of clause I2, wherein: the code is printed on a label supported by the ferromagnetic component; the label comprises a fluorescent material; and the method further comprises using an ultraviolet light supported by the robot to illuminate the fluorescent material.

Clause I4. The method of clause I2 or clause I3, wherein the code comprises a bar code or quick response code.

Clause I5. The method of any of clauses I1 through I4, wherein the ferromagnetic component comprises a steel tag.

Clause I6. The method of clause I5, wherein the steel tag comprises gauge galvanized steel or ferritic stainless steel.

Clause I7. The method of any of clauses I1 through I4, wherein the ferromagnetic component comprise a polymer tag embedded with ferromagnetic particles.

Clause I8. The method of clause I7, wherein the polymer tag comprises an elastomer polymer.

Clause I9. The method of any of clauses I1 through I8, wherein the magnetic collection tip comprises a permanent magnet.

Clause I10. The method of clause I9, wherein the permanent magnet comprises multiple poles of alternating polarity.

Clause I11. The method of any of clauses I1 through I8, wherein the magnetic collection tip comprises an electromagnet configured to engage the ferromagnetic component.

Clause I12. The method of clause I11, further comprising: controlling the electromagnet to cause the magnetic collection tip to selectively disengage from the ferromagnetic component.

Clause I13. The method of any of clauses I1 through I8, wherein the magnetic collection tip comprises a magnetic switchable device configured to engage the ferromagnetic component.

Clause I14. The method of clause I13, further comprising: controlling the magnetic switchable device to cause the magnetic collection tip to selectively disengage from the ferromagnetic component.

Clause I15. The method of any of clauses I1 through I14, wherein the robot comprises a drone, and the method further comprises: operating one or more propellers of the drone to cause the drone to fly to a position near a bin in which the item is located.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for retrieving an item from a bin, comprising:
controlling one or more propellers of a drone to cause the drone to fly to a position near the bin;
controlling the drone to cause a distal end of a picking arm to extend away from the drone;
controlling the drone to cause a magnetic component at the distal end of the picking arm to engage a ferromagnetic component attached to the item; and
controlling the drone to cause the distal end to move toward the drone while the magnetic component is engaged with the ferromagnetic component.

2. The method of claim 1, wherein:
the ferromagnetic component is included in a tag adhered to packaging of the item using an adhesive.

3. The method of claim 2, further comprising:
using one or more sensors of the drone to detect the tag in the bin and read a code on the tag; and
determining, by the drone, that the code corresponds to the item.

4. The method of claim 2, wherein the ferromagnetic component comprises gauge steel or a polymer embedded with a ferromagnetic material.

5. The method of claim 2, wherein the magnetic component comprises a permanent magnet.

6. The method of claim 2, wherein the magnetic component comprises an electromagnet which is selectively energized to engage or disengage from the ferromagnetic component of the tag.

7. A method for retrieving an item from a bin comprising:
controlling a robot to move to a position near the bin;
using an ultraviolet light source on the robot to illuminate a fluorescent material of a tag that is adhered to packaging of the item using an adhesive;
using one or more sensors of the robot to detect the tag in the bin and read a code on the tag;
determining, by the robot, that the code corresponds to the item;
controlling the robot to cause a distal end of a picking arm to extend away from the robot;
controlling the robot to cause a magnetic component at the distal end of the picking arm to engage a ferromagnetic component included in the tag; and
controlling the robot to cause the distal end to move toward the robot while the magnetic component is engaged with the ferromagnetic component.

8. The method of claim 7, wherein the robot comprises a drone, and controlling the robot to move to the position comprises:
controlling one or more propellers of the drone to cause the drone to fly to the position.

9. A service drone, comprising:
a frame;
one or more propellers coupled to the frame;
one or more first motors configured to drive the one or more propellers to provide thrust to navigate the service drone within an environment;
a picking arm coupled to the frame, the picking arm having a distal end;
an end effector coupled to the distal end, wherein the end effector comprises a permanent magnet adapted to engage a ferromagnetic component of a tag adhered to an item;
one or more second motors configured to cause the distal end to move relative to the frame; and
one or more processors configured to carry out an assigned mission to retrieve the item from a bin by (A) controlling the one or more first motors to navigate the service drone to the bin, (B) controlling the one or more second motors to cause the distal end to be moved away from the frame to enable the end effector to engage the item, and (C) controlling the one or more second motors to cause the distal end to be moved toward the frame while the end effector is engaged with the item.

10. The service drone of claim 9, further comprising:
a member configured and arranged on the frame to contact the item when the one or more second motors cause the distal end to move close to the frame, thus causing the ferromagnetic component of the tag to become disengaged from the permanent magnet.

11. The service drone of claim 9, further comprising a camera and an illumination source coupled to the distal end of the picking arm to read a code on the item.

12. The service drone of claim 11, wherein the illumination source comprises an ultraviolet light.

13. A service drone, comprising:
a frame;
one or more propellers coupled to the frame;
one or more first motors configured to drive the one or more propellers to provide thrust to navigate the service drone within an environment;
a picking arm coupled to the frame, the picking arm having a distal end;
an end effector coupled to the distal end, wherein the end effector comprises an electromagnet;
one or more second motors configured to cause the distal end to move relative to the frame; and
one or more processors configured to carry out an assigned mission to retrieve an item from a bin by (A) controlling the one or more first motors to navigate the service drone to the bin, (B) controlling the one or more second motors to cause the distal end to be moved away from the frame to enable the end effector to engage the item, and (C) controlling the one or more second motors to cause the distal end to be moved toward the frame while the end effector is engaged with the item, wherein the one or more processors are further configured to control the electromagnet to cause the electromagnet to selectively engage or disengage from a ferromagnetic component of a tag adhered to the item.

14. A tag for use with a robot collection system, comprising:
   a ferromagnetic component configured to be attracted to a magnetic collection tip of a robot;
   a label supported by the ferromagnetic component, wherein the label comprises a fluorescent material and includes a representation of a computer-readable code corresponding to an item; and
   an adhesive surface for securing the tag to the item.

15. The tag of claim 14, wherein the computer-readable code comprises a bar code or a quick response code.

16. The tag of claim 14, wherein the ferromagnetic component comprises gauge galvanized steel or ferritic stainless steel.

17. The tag of claim 14, wherein the ferromagnetic component comprises a polymer embedded with ferromagnetic particles.

18. A tag for use with a robot collection system comprising:
   a ferromagnetic component configured to be attracted to a magnetic collection tip of a robot;
   an adhesive surface for securing the tag to an item; and
   a flexible lead, wherein:
      the ferromagnetic component is disposed at a first end of the flexible lead; and
      the adhesive surface is disposed at a second end of the flexible lead opposite the first end.

19. The tag of claim 18, further comprising:
   a label supported by the ferromagnetic component, the label including a representation of a computer-readable code corresponding to the item.

20. The tag of claim 19, wherein the label comprises a fluorescent material.

21. A method, comprising:
   adhering a tag comprising a ferromagnetic component to an item to be retrieved by a drone;
   controlling one or more propellers of the drone to cause the drone to fly to a first position near the item;
   operating the drone so that an attractive force between a magnetic collection tip of the drone and the ferromagnetic component lifts the item to enable the drone to move the item to another location; and
   controlling the one or more propellers to cause the drone to fly from the first position to a drop destination for the item.

22. The method of claim 21, wherein the ferromagnetic component comprises gauge steel or a polymer embedded with a ferromagnetic material.

23. The method of claim 21, wherein the item is disposed in a bin, and the method further comprises:
   using one or more sensors of the drone to detect the tag in the bin and read a code on the tag; and
   determining, by the drone, that the code corresponds to the item.

24. The method of claim 21, wherein the magnetic collection tip comprises a permanent magnet.

25. The method of claim 21, wherein the magnetic collection tip comprises an electromagnet, and the method further comprises:
   operating the electromagnet to selectively generate the attractive force between the magnetic collection tip and the ferromagnetic component of the tag.

26. A method, comprising:
   adhering a tag comprising a ferromagnetic component to an item to be retrieved by a robot, wherein the tag includes a fluorescent material;
   using an ultraviolet light source on the robot to illuminate fluorescent material; and
   operating the robot so that an attractive force between a magnetic collection tip of the robot and the ferromagnetic component lifts the item to enable the robot to move the item to another location.

27. The method of claim 26, wherein the robot comprises a drone, and the method further comprises:
   controlling one or more propellers of the drone to cause the drone to fly to a first position near the item; and
   controlling the one or more propellers to cause the drone to fly from the first position to a drop destination for the item.

28. A method for retrieving an item from a bin comprising:
   controlling a robot to move to a position near the bin;
   controlling the robot to cause a distal end of a picking arm to extend away from the robot;
   controlling the robot to cause a permanent magnet at the distal end of the picking arm to engage a ferromagnetic component included in a tag that is adhered to packaging of the item using an adhesive; and
   controlling the robot to cause the distal end to move toward the robot, while the permanent magnet is engaged with the ferromagnetic component, until the tag contacts a portion the robot that is configured to engage the tag, thus causing the permanent magnet to release the item.

29. The method of claim 28, wherein:
   the ferromagnetic component is included in a tag adhered to packaging of the item using an adhesive.

30. The method of claim 28, wherein the robot comprises a drone, and controlling the robot to move to the position comprises:
   controlling one or more propellers of the drone to cause the drone to fly to the position.

* * * * *